(12) United States Patent
Barthe et al.

(10) Patent No.: US 8,377,836 B2
(45) Date of Patent: Feb. 19, 2013

(54) METHODS OF MAKING CERAMIC BODIES USING CATALYZED PORE FORMERS AND COMPOSITIONS FOR MAKING THE SAME

(75) Inventors: Philippe J Barthe, Bois le Roi (FR); Irene Mona Peterson, Elmira Heights, NY (US); Andrew Paul Schermerhorn, Painted Post, NY (US)

(73) Assignee: Corning Incorporated, Corning, NY (US)

(*) Notice: Subject to any disclaimer, the term of this patent is extended or adjusted under 35 U.S.C. 154(b) by 439 days.

(21) Appl. No.: 12/470,535

(22) Filed: May 22, 2009

(65) Prior Publication Data

US 2010/0298113 A1    Nov. 25, 2010

(51) Int. Cl.
*C04B 38/06* (2006.01)
(52) U.S. Cl. ............. 501/81; 501/82; 501/83; 501/134; 264/44; 264/630; 264/631
(58) Field of Classification Search ............. 501/80–83, 501/134; 264/44, 630, 631
See application file for complete search history.

(56) References Cited

U.S. PATENT DOCUMENTS 6,620,751 B1 * 9/2003 Ogunwumi ............... 501/80

FOREIGN PATENT DOCUMENTS

| CN | 1 456 535 | | 2/2005 |
| DE | 197 49 350 A1 | | 5/1999 |
| JP | 2003-236384 A | | 8/2003 |
| WO | 2005/053845 A1 | | 6/2005 |
| WO | 2007092022 | * | 8/2007 |

OTHER PUBLICATIONS

Xianxian Wu et al., Catalytic oxidation of carbon/carbon composite materials in the presence of potassium and calcium acetates, Carbon 43, 2005, pp. 333-344, available online at www.sciencedirect.com.

* cited by examiner

*Primary Examiner* — Karl Group
(74) *Attorney, Agent, or Firm* — Robert P. Santandrea (57) ABSTRACT

The present disclosure relates to methods of making ceramic bodies using catalyzed pore formers and compositions for making the same.

12 Claims, 8 Drawing Sheets

METHODS OF MAKING CERAMIC BODIES USING CATALYZED PORE FORMERS AND COMPOSITIONS FOR MAKING THE SAME

FIELD OF THE DISCLOSURE

The present disclosure relates to methods of making ceramic bodies using catalyzed pore formers and compositions for making the same.

BACKGROUND

Ceramic bodies may be used in a variety of applications, such as, for example, supports for catalysts for carrying out chemical reactions and as sorbents/filters for the capture of particulate, liquid, or gaseous species from fluids such as gas streams and liquid streams. Certain ceramic bodies, such as honeycombs, comprising activated carbon may be used as catalyst substrates or for the capture of heavy metals from gas streams. Some ceramic bodies may also be used for the capture of diesel or gasoline particulates.

Ceramic bodies may be manufactured by firing an unprocessed or "green" body. The green body may be enriched with pore formers, which may be carbon-based materials. During firing of the green body, the pore formers may be burned out, for example as carbon oxides, thereby generating porosity in the fired ceramic body. The amount of pore former added at the green stage may be increased to increase porosity, and uniform removal of the increased amount of pore former may affect the physical strength and long term performance of the ceramic body for certain applications.

SUMMARY

In accordance with the detailed description and various exemplary embodiments described herein, the present disclosure relates to methods of making ceramic bodies, the methods comprising forming a green body from a batch material comprising at least one inorganic ceramic-forming component and at least one catalyzed pore former, and firing the green body.

The present disclosure further relates to ceramic batch materials comprising at least one inorganic ceramic-forming component and at least one catalyzed pore former.

The disclosure further relates to ceramic bodies made in accordance with the methods described in the present disclosure.

BRIEF DESCRIPTION OF THE DRAWINGS

The accompanying drawings are included to provide a further understanding of the disclosure, and are incorporated in and constitute a part of this specification. The drawings are not intended to be restrictive, but rather are provided to illustrate exemplary embodiments and, together with the description, serve to explain the principles disclosed herein.

DETAILED DESCRIPTION

It is to be understood that both the foregoing general description and the following detailed description are exemplary and explanatory only and are not restrictive of the claims. Other embodiments will be apparent to those skilled in the art from consideration of the specification and practice of the embodiments disclosed herein.

The present disclosure relates to methods of making ceramic bodies comprising forming a green body from a batch material comprising at least one inorganic ceramic-forming component and at least one catalyzed pore former, and firing the green body.

The present disclosure also relates to ceramic batch materials comprising at least one inorganic ceramic-forming component and at least one catalyzed pore former.

The disclosure further relates to ceramic bodies made in accordance with the methods of the present disclosure, including those comprising at least one of aluminum titanate and cordierite.

As used herein, the term "batch material," and variations thereof, is intended to mean a substantially homogeneous mixture of ceramic-forming components and at least one catalyzed pore former.

In various embodiments, the ceramic-forming components comprise at least one inorganic ceramic-forming component. In various exemplary embodiments of the present disclosure, the at least one inorganic ceramic-forming component may be comprised of at least one of an alumina source, a silica source, and a titania source.

Sources of alumina include, but are not limited to, powders that, when heated to a sufficiently high temperature in the absence of other raw materials, will yield substantially pure aluminum oxide. Examples of such alumina sources include alpha-alumina, a transition alumina such as gamma-alumina or rho-alumina, hydrated alumina, gibbsite, corundum ($Al_2O_3$), boehmite (AlO(OH)), pseudoboehmite, aluminum hydroxide ($Al(OH)_3$), aluminum oxyhydroxide, and mixtures thereof.

Sources of silica include, but are not limited to, non-crystalline silica, such as fused silica or sol-gel silica, silicone resin, low-alumina substantially alkali-free zeolite, diatomaceous silica, kaolin, and crystalline silica, such as quartz or cristobalite. Additionally, the sources of silica may include silica-forming sources that comprise a compound that forms free silica when heated, such as, for example, silicic acid or a silicon organometallic compound.

Sources of titania include, but are not limited to, rutile, anatase, and amorphous titania.

As used herein, the term "catalyzed pore former," and variations thereof, is intended to mean at least one carbonaceous pore former carrying at least one catalyst.

As used herein, the term "carbonaceous pore former," and variations thereof, means organic materials chosen from, for example: carbon (such as, for example, graphite, activated carbon, petroleum coke, and carbon black), starch (such as, for example, corn, barley, bean, potato, rice, tapioca, pea, sago palm, wheat, canna, and walnut shell flour), and polymers (such as, for example, polybutylene, polymethylpentene, polyethylene (preferably beads), polypropylene (preferably beads), polystyrene, polyamides (nylons), epoxies, ABS, Acrylics, and polyesters (PET)). In at least one embodiment, the at least one carbonaceous pore former may be graphite.

In various exemplary embodiments, the at least one carbonaceous pore-forming material may be in a granular/powder form or in pellet form. In various further exemplary embodiments, one of skill in the art may choose the at least one carbonaceous pore-forming material from granular materials so that the median particle diameter of the at least one carbonaceous pore-forming material may range from 1 μm to 200 μm, such as, for example, from 5 μm to 100 μm, or from 5 μm to 50 μm.

Catalysts of the present disclosure include, for example, any metal element in any oxidation state, in elemental form or in a chemical compound or moiety comprising the metal, which is in a form that promotes decomposition or burnout, in any degree, of the at least one pore former during firing. As used herein, the terms "burnout," "burned out," "burn out," and variations thereof are intended to mean decomposition and/or removal of the at least one pore former during firing. For example, burnout of carbonaceous pore formers may comprise heating the pore formers to decomposition as carbon oxides.

In various embodiments, the at least one catalyst may be in the form of a molecular species containing the catalytic element, as a supported species containing the catalytic element, or as a colloidal material containing the catalytic element.

Non-limiting examples of metal catalysts in elemental form include alkali metals, alkaline earth metals, transition metals, rare earth metals (including lanthanoids), and other metals such as aluminum, gallium, indium, tin, lead, and bismuth.

As mentioned above, the metal catalysts can exist at any valency. For example, if iron is present, it may be present at +3, +2 or 0 valencies or as mixtures of differing valences, and can be present as metallic iron (0), or in FeO, $Fe_2O_3$, $Fe_3O_8$, FeS, $FeCl_2$, $FeCl_3$, $FeSO_4$, and the like. As another example, if manganese is present, it may be present at +4, +2 or 0 valencies or as mixtures of differing valencies, and can be present as metallic manganese (0), or in MnO, $MnO_2$, MnS, $MnCl_2$, $MnCl_4$, $MnSO_4$, and the like.

In some embodiments of the disclosure, the catalyst may be an alkali metal, such as lithium, sodium, or potassium. In other embodiments, the catalyst may be an alkali earth metal, such as magnesium, calcium, or barium. In other embodiments, the catalyst may be a transition metal, such as palladium, platinum, silver, gold, manganese, or iron. In yet further embodiments, the catalyst may be a rare earth metal such as cerium. In some embodiments, the catalyst may be in elemental form. In other embodiments, the catalyst may be present as a metal sulfide. In other embodiments, the catalyst may be present as a transition metal sulfide or oxide. In various embodiments, the at least one catalyst is chosen from salts of alkali metals, alkali earth metals, transition metals, and lanthanide metals. In further embodiments, the at least one catalyst is chosen from salts of calcium, potassium, copper, iron, nickel, and cerium.

In various embodiments of the present disclosure, the catalyzed pore former may comprise at least two catalysts, such as at least three catalysts. For example, the at least two catalysts may be chosen from the combination of copper and cerium and the combination of iron and cerium.

It is within the ability of one skilled in the art to select the at least one catalyst based on, for example, the application for which the catalyzed pore former is used, and the desired carbon-removing capacity and efficiency of the catalyst.

In various embodiments, the at least one carbonaceous pore former carries the at least one catalyst. As used herein, the term "carries," and variations thereof, is intended to mean that the catalyst is incorporated into or onto the at least one pore former by any method known in the art. In various embodiments, this may be achieved by impregnation of the at least one pore former, such as, by incipient wetness impregnation. For example, the active metal catalyst precursor may be dissolved in an aqueous or organic solution and then added to the carbonaceous pore former, for example, dropwise while mixing. The solution may be drawn into the pore former and then may be dried and calcined to drive off the volatile components within the solution. In at least one embodiment, at least one catalyzed pore former may be obtained by incipient wetness impregnation using calcium acetate aqueous solution and graphite powder.

The amount of catalyst mixed with the carbonaceous pore former may be determined by those skilled in the art, and may be chosen, for example, based upon the particular catalyst used, the application for which the catalyzed pore former is used, and the desired carbon-removing capacity and efficiency of the catalyst. By way of example, the catalyst may comprise from 0.01 wt % to 20 wt % of the catalyzed pore former, such as from 0.1 wt % to 10 wt % or 1 wt % to 5 wt % of the catalyzed pore former. The weight percent of catalyst is calculated on the basis of elemental metal, with any weight percents of metal in other states converted to elemental state for the purpose of calculation of the total amount of metal catalyst in the catalyzed pore former. Metal elements present in an inert form, such as in an inorganic binder compound, are not considered catalysts and do not contribute to the weight percent of a catalyst. The amount of catalyst may be determined using any appropriate analytical technique, such as, for example, mass spectroscopy.

In various exemplary embodiments, the at least one catalyzed pore former may be present in the batch material in any amount, such as in an amount sufficient to achieve a desired result. For example, the at least one catalyzed pore-forming material may comprise at least 10 wt % of the batch material, such as from 10 to 50 wt % or 20 to 40 wt %, or such as 30 wt % of the batch material. The catalyzed pore former may, in various embodiments, be added as a super-addition, i.e., the ceramic-forming components comprise 100% of the batch material, such that in an exemplary embodiment where the catalyzed pore former is present in an amount of 10 wt % of the batch material, the total weight of the batch material is 110% of the weight of the batch material before the addition of catalyzed pore former.

In various exemplary embodiments, the batch material may further comprise at least one additional carbonaceous pore former, which may not be catalyzed. For example, the batch material may comprise a combination of catalyzed graphite and graphite without a catalyst.

The batch material may be made by any method known to those of skill in the art. By way of example, in at least one embodiment where the batch materials comprise at least two inorganic ceramic-forming components, the inorganic ceramic-forming components may be combined as powdered materials and intimately mixed to form a substantially homogeneous mixture. The at least one catalyzed pore former may be added to form a batch mixture before or after the inorganic ceramic-forming components are intimately mixed. Whether added before or after the inorganic ceramic-forming components are intimately mixed, the at least one catalyzed pore former and inorganic ceramic-forming components may then be intimately mixed to form a substantially homogeneous batch material. It is within the ability of one of skill in the art to determine the appropriate steps and conditions for combining the at least one ceramic-forming component and at least one catalyzed pore former.

In additional exemplary embodiments, the at least one catalyzed pore former and at least one ceramic-forming component may be mixed with any other known component useful for making batch material. By way of example only, a binder, such as an organic binder, and/or a solvent may be added to the batch material to form a plasticized mixture.

If desired, it is within the ability of one skilled in the art to select an appropriate binder. By way of example only, an organic binder may be chosen from cellulose-containing components such as, for example, methylcellulose, methylcellulose derivatives, and combinations thereof.

It is also within the ability of one skilled in the art to select an appropriate solvent, if desired. In various exemplary embodiments, the solvent may be water, for example deionized water.

Additional components, such as organic binder and/or solvent, may be mixed with the at least one catalyzed pore former and at least one ceramic-forming component individually, in any order, or together to form a substantially homogeneous batch mixture. It is within the ability of one of skill in the art to determine the appropriate conditions for mixing the at least one catalyzed pore former and at least one ceramic-forming component with additional components. For example, the batch material may be mixed by a kneading process to form a substantially homogeneous batch mixture.

The batch material may, in various embodiments, be shaped into a green body by any process known to those of skill in the art. By way of example, the batch material may be injection-molded or extruded and optionally dried by conventional methods known to those of skill in the art to form a green body.

In various exemplary embodiments, the green body may then be fired to form a ceramic body. It is within the ability of one skilled in the art to determine the appropriate method and conditions for forming a ceramic body, such as, for example, firing conditions including equipment, temperature and duration, to achieve a ceramic body. Such methods and conditions may depend, for example, upon the size and composition of the green body, as well as the desired properties of the ceramic body. The composition of the batch material of the present disclosure may allow for shorter firing times than those used for batch materials comprising conventional carbonaceous pore formers, and in a further embodiment, this may result in the ability to make larger ceramic bodies as well. As described herein, ceramic bodies include, but are not limited to, those comprised of cordierite, silicon carbide, mullite, or aluminum titanate, and may, in at least one embodiment, comprise a honeycomb structure.

In various embodiments of the present disclosure, the ceramic bodies made from the methods disclosed herein are substantially free of the carbonaceous pore former after firing. As used herein, "substantially free" is intended to mean that the ceramic body, including the interior, appears to be free of carbon upon visual inspection.

In various embodiments of the present disclosure, the batch materials, including the at least one catalyzed pore former, may be selected to reduce the apparent activation energy required for burnout of the at least one carbonaceous pore former. By "reduce the apparent activation energy required for burnout of the at least one carbonaceous pore former," and variations thereof, it is meant that the apparent activation energy needed for burnout of the at least one carbonaceous pore former in batch materials of the present disclosure is less than that needed for burnout of the at least one carbonaceous pore former in batch materials not falling within the scope of the present disclosure. In further embodiments, the batch materials, including the at least one catalyzed pore former, may be selected to reduce the temperatures and/or time needed for burnout of the at least one carbonaceous pore former from batch materials of the present disclosure or firing of green bodies made from batch material of the present disclosure relative to the temperatures and/or time needed for burnout of the at least one carbonaceous pore former from batch materials not falling within the scope of the present disclosure.

Burnout of carbonaceous pore formers is highly exothermic and may need to be controlled to prevent high thermal stress, which may damage the ceramic body. In various embodiments of the present disclosure, use of the catalyzed pore formers may permit control of the heat released during carbonaceous pore former burnout. For example, in various embodiments, once the firing temperature is above the thermodynamic limit for carbon oxidation, the burnout of the catalyzed pore former may occur at a faster rate than for standard pore formers or batch materials not falling within the scope of the present disclosure. In at least one embodiment, burnout may begin at a "reduced temperature," which is intended to mean that burnout begins at a lower temperature with catalyzed pore formers or batch materials of the present disclosure than with standard pore formers in batch materials not within the scope of the present disclosure and may, therefore, reach a lower maximum peak temperature during firing than with standard pore formers in batch materials not within the scope of the present disclosure. In at least one embodiment, the burnout may occur in "reduced time," which is intended to mean that the use of catalyzed pore formers in the batch materials of the present disclosure may reduce the need for successive temperature ramps and/or the dwell time during firing relative to those used for standard pore formers in batch materials not within the scope of the present disclosure. In a still further embodiment, the use of catalyzed pore formers may reduce the use of nitrogen to decrease oxygen partial pressure during firing to control combustion. For example, use of the batch materials of the present disclosure may allow the use of more air in nitrogen/air mixes during firing.

Unless otherwise indicated, all numbers used in the specification and claims are to be understood as being modified in all instances by the term "about," whether or not so stated. It should also be understood that the precise numerical values used in the specification and claims form additional embodiments. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary. Thus, for example, the use of "the catalyzed pore former" or "a catalyzed pore former" is intended to mean at least one catalyzed pore former.

Other embodiments of the disclosure will be apparent to those skilled in the art from consideration of the specification and practice of the embodiments disclosed herein. It is intended that the specification and examples be considered as exemplary only, with a true scope and spirit being indicated by the claims.

EXAMPLES

The following examples are not intended to be limiting of the claims.

Example 1

Two batch materials, one using a standard pore former and the other using a catalyzed pore former as in the present disclosure, were prepared using the materials set forth in Table 1 below. The catalyzed pore former was made using an incipient wetness impregnation technique. Graphite pellets (3 to 5 mm in diameter and 1 to 2 cm in length) were used as the carbonaceous pore former. A calcium acetate aqueous solution was gently dropped onto the graphite pellets, which were set in a rotating bowl so that fresh pellet surfaces were continuously exposed to the solution drops. The final Ca loading on the graphite pellets was 0.5 wt % Ca. The pellets were treated overnight at 120° C. in air and then for 3 hours at 350° C. under nitrogen. The catalyzed graphite pellets were then gently ground, and the resulting powder was sieved to produce size homogeneity commensurate with the graphite used in the Comparative 1 batch.

The inorganic ceramic-forming components set forth in Table 1 were combined in powder form. The pore formers set forth in Table 1, which comprise 30 wt % of the batch material as super additions, were then added to the inorganic materials and intimately mixed to produce substantially homogeneous mixtures.

Methyl cellulose, which comprises 4.5 wt % of the batch materials as a super-addition, was added as a powder to the batch materials. Then water and an extrusion aid, which comprise 16 wt % and 2 wt % of the batch materials as super-additions, respectively, were added.

TABLE 1

Composition of Batches

| Material | Weight Percent Batch | |
|---|---|---|
| | Comparative 1 | Catalyzed 1 |
| Inorganics | | |
| SiO$_2$ | 10.19 | 10.19 |
| SrCO$_3$ | 8.0 | 8.0 |
| CaCO$_3$ | 1.38 | 1.38 |
| Al$_2$O$_3$ | 46.57 | 46.57 |
| TiO$_2$ | 29.95 | 29.95 |
| Al(OH)$_3$ | 3.71 | 3.71 |
| La$_2$O$_3$ | 0.20 | 0.20 |
| Pore Former | | |
| Graphite | 30.00 | |
| Catalyzed Graphite (described above) | | 30.00 |
| Solid Binders/Organics | | |
| Methyl Cellulose | 4.50 | 4.50 |
| Liquid Additions | | |
| Extrusion Aid* | 16.00 | 16.00 |
| Water | 2.00 | 2.00 |

Figure 1:
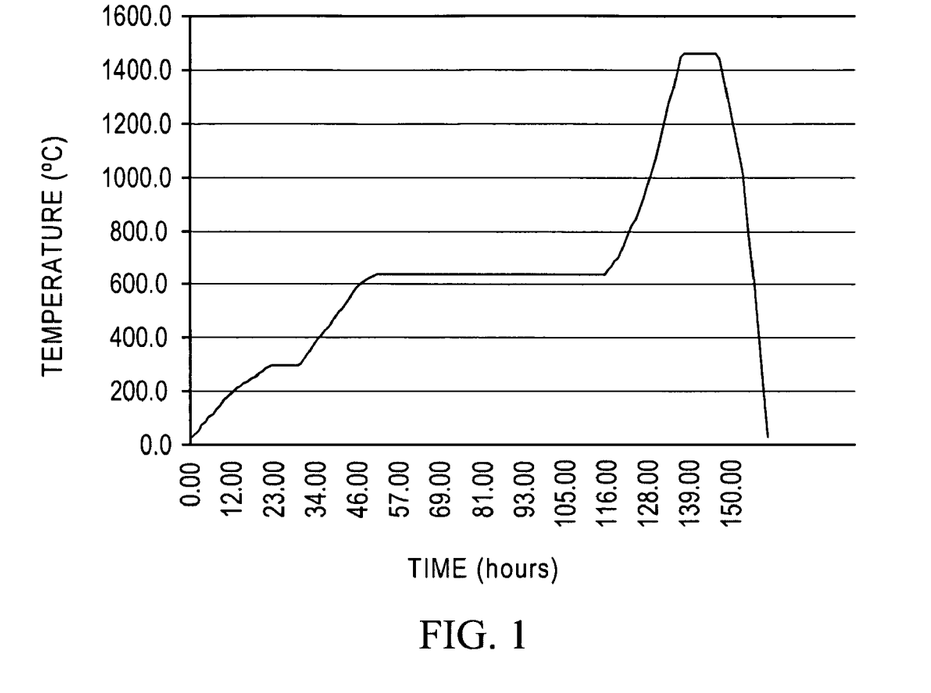
FIG. 1 is a graphical representation of the firing schedule for the green bodies described in Example 1, below.

*Extrusion Aid Composition: 92 wt % water, 7 wt % tall oil, and 1 wt % triethanol amine The mixtures were kneaded to form plasticized mixtures and extruded to form cylindrical green bodies, 1 inch in diameter. A green body from each batch was fired in accordance with the firing schedule set forth in FIG. 1. Aluminum titanate-containing ceramic bodies were produced.

As seen in Table 2, the porosity and CTE of the fired ceramic bodies of each batch did not show any significant differences.

TABLE 2

Characterization of Fired Bodies

| Batch | % Porosity | Total Intrusion Volume ml/g | Median Pore Diameter (d50) μm | Bulk Density | Apparent Density | (d50 − d10)/d50 |
|---|---|---|---|---|---|---|
| Comparative 1 | 50.12 | 0.279 | 16.179 | 1.80 | 3.60 | 0.28 |
| Catalyzed 1 | 48.4151 | 0.2649 | 15.7155 | 1.83 | 3.54 | 0.30 |

Figure 5:
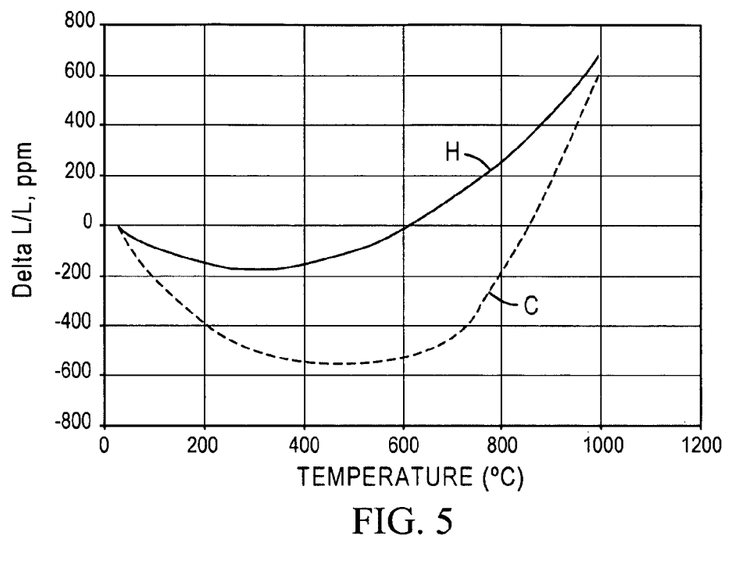
FIG. 5 shows the dilatometer curves for a body made from Comparative 1 Batch of Example 1, below.
Figure 6:
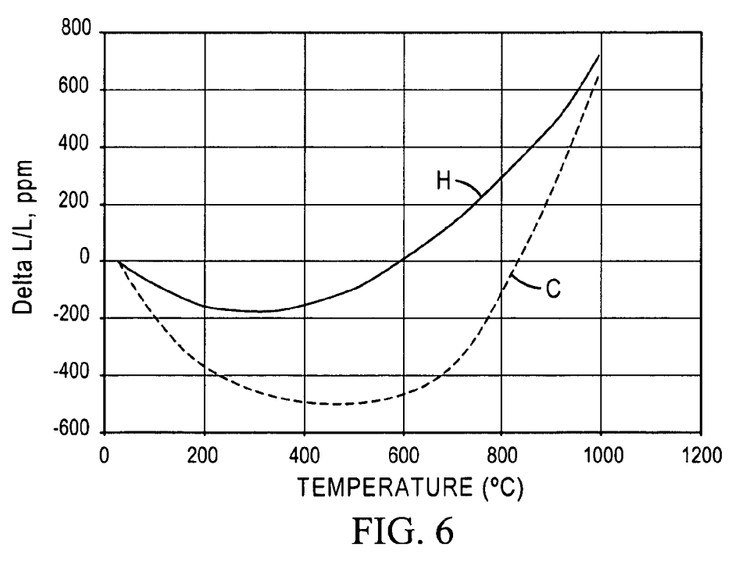
FIG. 6 shows the dilatometer curves for a body made from Catalyzed 1 Batch of Example 1, below.
Figure 7:
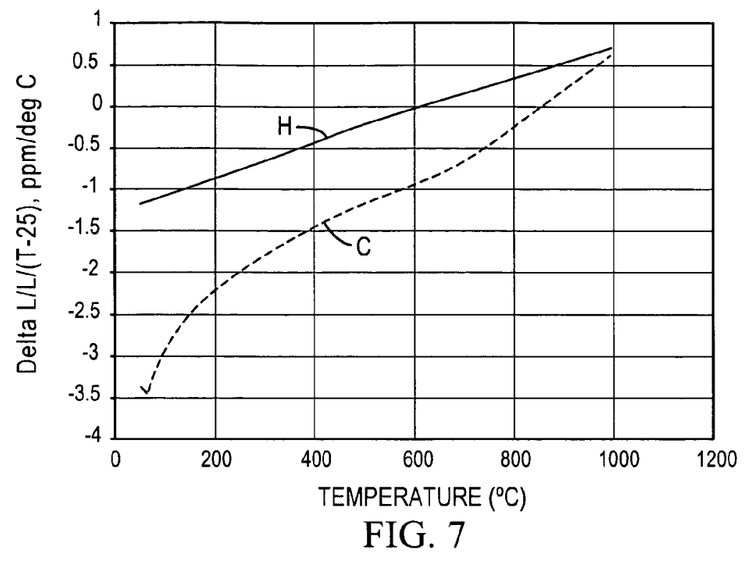
FIG. 7 shows the average coefficients of thermal expansion (CTE) for a body made from Comparative 1 Batch of Example 1, below.
Figure 8:
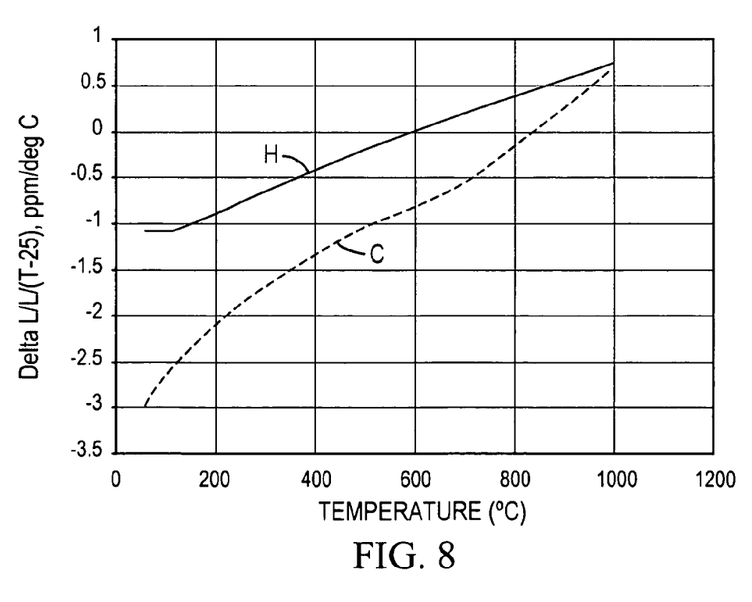
FIG. 8 shows the average CTEs for a body made from Catalyzed 1 Batch of Example 1, below.

The dilatometer curves for samples of the Comparative 1 and Catalyzed 1 batches are shown in FIGS. 5 and 6 (wherein H identifies the heating curves, and C identifies the cooling curves), respectively, and the corresponding CTE are shown in FIGS. 7 and 8 (wherein H identifies the heating curves, and C identifies the cooling curves), respectively.

The seven additional green bodies from each batch were fired in accordance with the conditions set forth in Table 3 below. Aluminum titanate-containing ceramic bodies were produced.

TABLE 3

Firing Conditions

| Sample | | Conditions | |
|---|---|---|---|
| Comparative 1 Batch | Catalyzed 1 Batch | Heating Rate (° C./min) | % Oxygen |
| C1 | 1 | 10 | 15 |
| C2 | 2 | 1 | 10 |
| C3 | 3 | 5 | 10 |
| C4 | 4 | 10 | 10 |
| C5 | 5 | 10 | 5 |
| C6 | 6 | 10 | Air |
| C7 | 7 | 20 | 10 |

Figure 2:
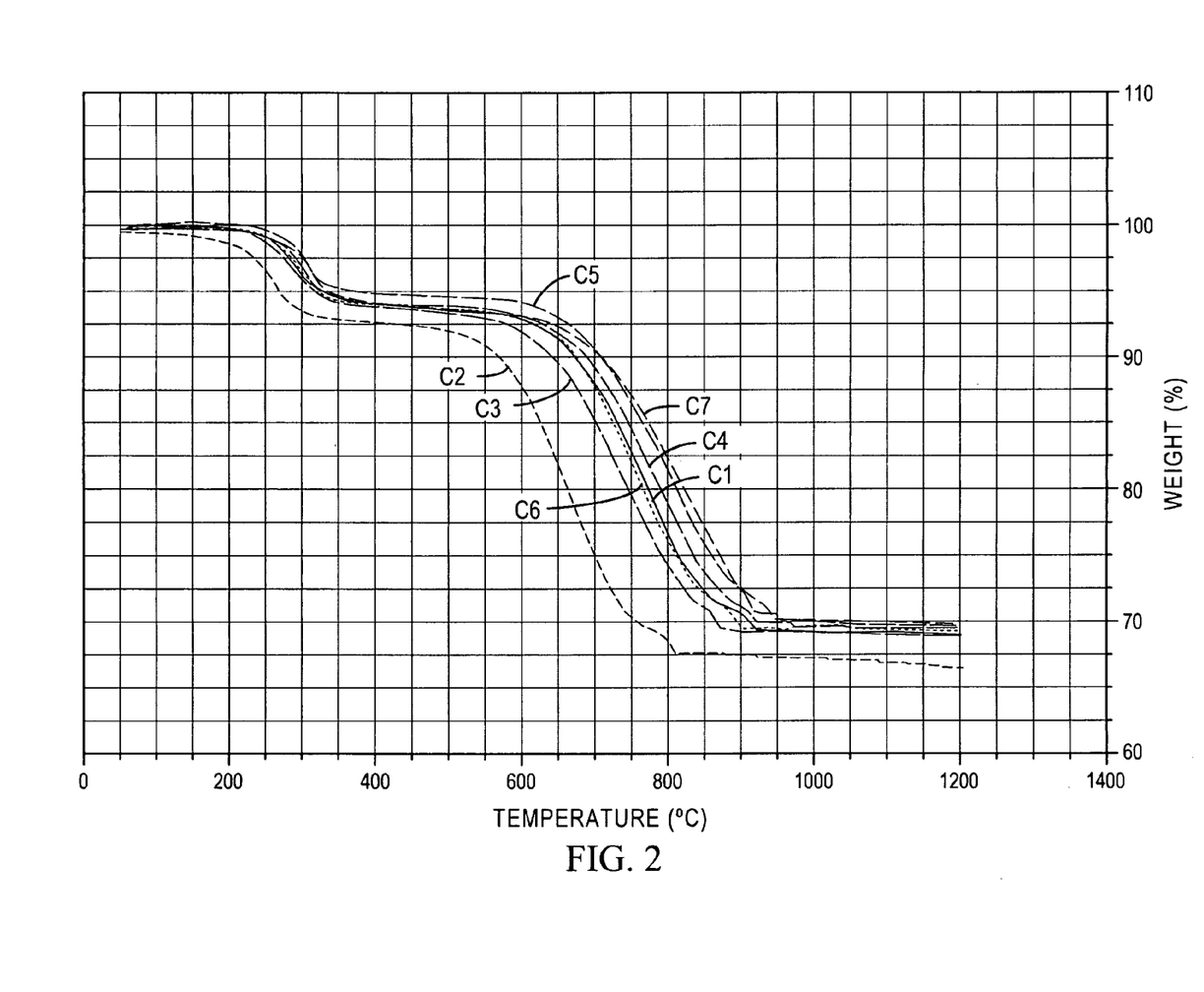
FIG. 2 shows the TGA curves for seven bodies made from the Comparative 1 Batch of Example 1, below.
Figure 3:
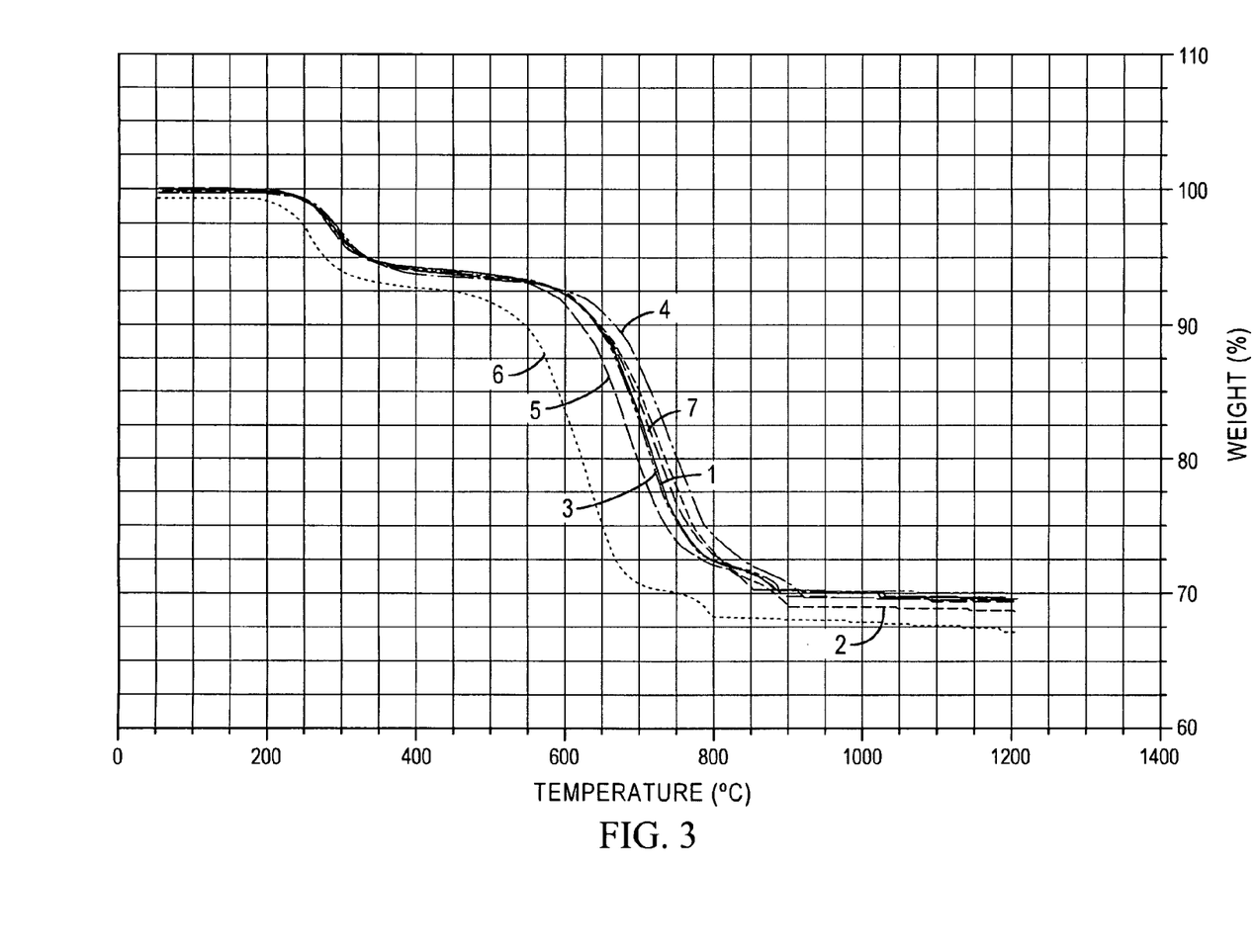
FIG. 3 shows the TGA curves for seven bodies made from the Catalyzed 1 Batch of Example 1, below.
Figure 4:
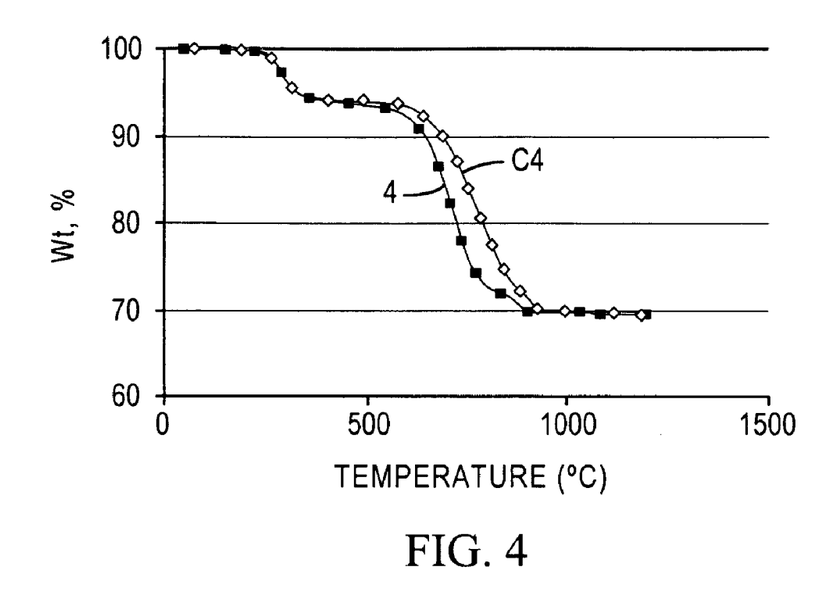
FIG. 4 shows a comparison of the TGA curves for two bodies made from two batches of Example 1, below (Comparative 1 Batch, sample C4 and Catalyzed 1 Batch, sample 4).

FIG. 2 shows TGA curves for the aluminum titanate bodies containing uncatalyzed pore formers (Comparative 1 Batch), i.e, samples 1 C-7C. FIG. 3 shows TGA curves for the aluminum titanate bodies containing catalyzed pore formers (Catalyzed 1 Batch), i.e, samples 1-7. FIG. 4 shows a comparison of the TGA curves of samples from the two batches (samples C4 and 4) fired under 90% nitrogen/10% oxygen at a heating rate of 10° C./min. As can be seen from the TGA curves, the catalyzed pore formers of the Catalyzed 1 Batch burned out faster than the uncatalyzed pore formers of the Comparative 1 Batch.

Thus, as exhibited by the data described herein, the use of catalyzed pore formers successfully reduced the time and temperature necessary to burnout pore formers and did not adversely change the porosity or CTE of the resulting ceramic bodies.

Example 2

Batch materials were prepared using the materials set forth in Table 4 below, including a catalyzed pore former in one batch. The catalyzed pore former was prepared as set forth above in Example 1. The inorganic materials were combined in powder form. The pore formers, which comprise 60 wt % of the batch materials as super additions, were then added to the inorganic materials and intimately mixed to produce substantially homogeneous mixtures.

Methyl cellulose and sodium stearate binder materials were added as powders to the batch materials, comprising 6.0 wt % and 1.0 wt % of the batch material as super-additions, respectively. Then water, which comprises 30 wt % of the batch material as a super-addition, was added.

TABLE 4

Composition of Batches

| | Weight Percent Batch | |
|---|---|---|
| Material | Comparative 2 | Catalyzed 2 |
| Inorganics | | |
| Talc | 42.38 | 42.38 |
| Alumina, Calcined | 34.12 | 34.12 |
| Silica | 23.50 | 23.50 |
| Magnesium Alumino Silicate (Added as a super addition) | 5.0 | 5.0 |
| Pore Former | | |
| Graphite | 45.0 | |
| Catalyzed Graphite (described in Example 1) | | 45.0 |
| Corn Starch | 15.0 | 15.0 |

TABLE 4-continued

Composition of Batches

| | Weight Percent Batch | |
|---|---|---|
| Material | Comparative 2 | Catalyzed 2 |
| Solid Binders/Organics | | |
| Methyl Cellulose | 6.0 | 6.0 |
| Sodium Stearate | 1.0 | 1.0 |
| Liquid Additions | | |
| Water | 30 | 30 |

The mixtures were kneaded to form plasticized mixtures and extruded to form cylindrical green bodies, 5.66 inches in diameter and 6 inches long. The resulting green bodies were fired and the thermocouple data is described in FIGS. 9A and 9B. Cordierite-containing ceramic bodies were produced.

Figure 9A:
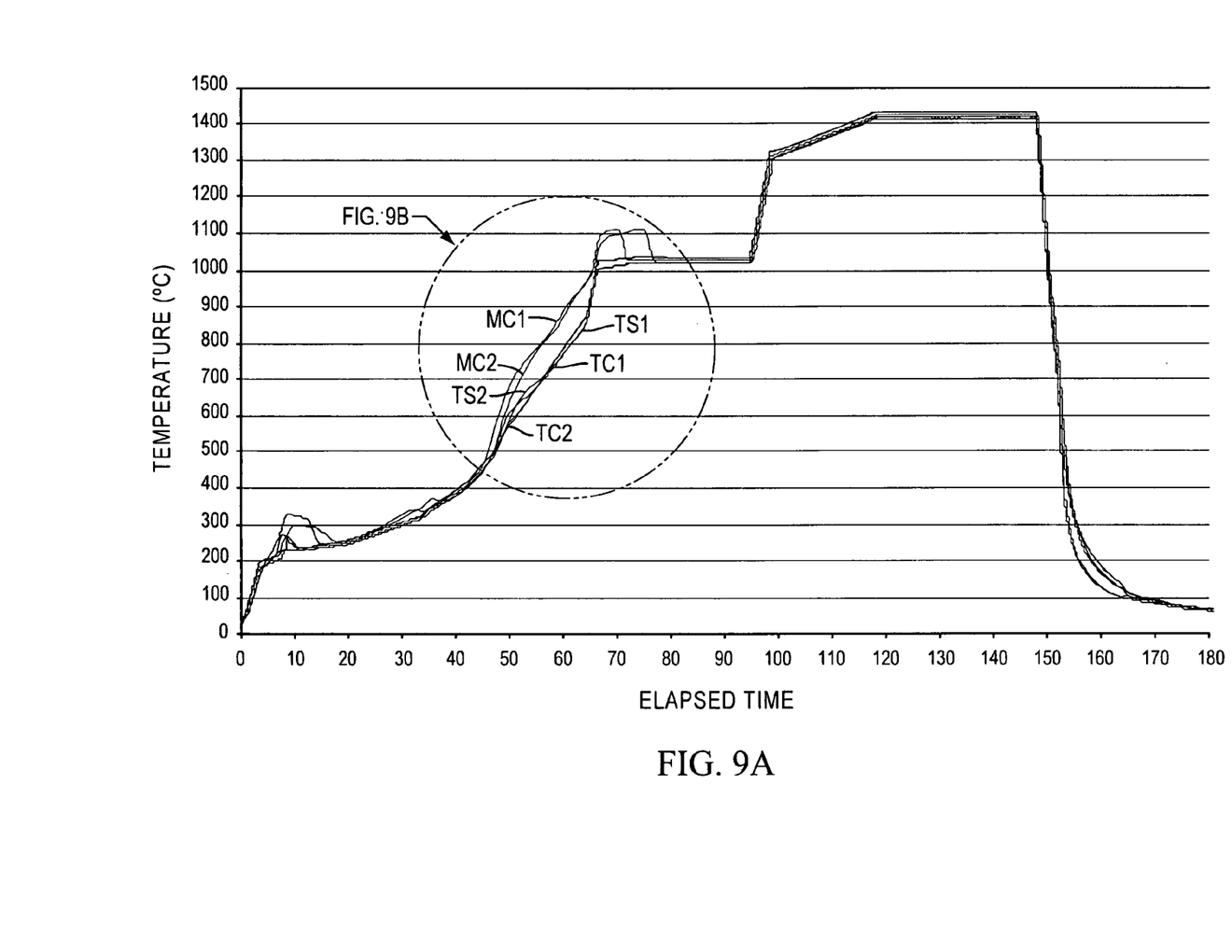
FIG. 9A shows the thermocouple data for the bodies described in Example 2, below.
Figure 9B:
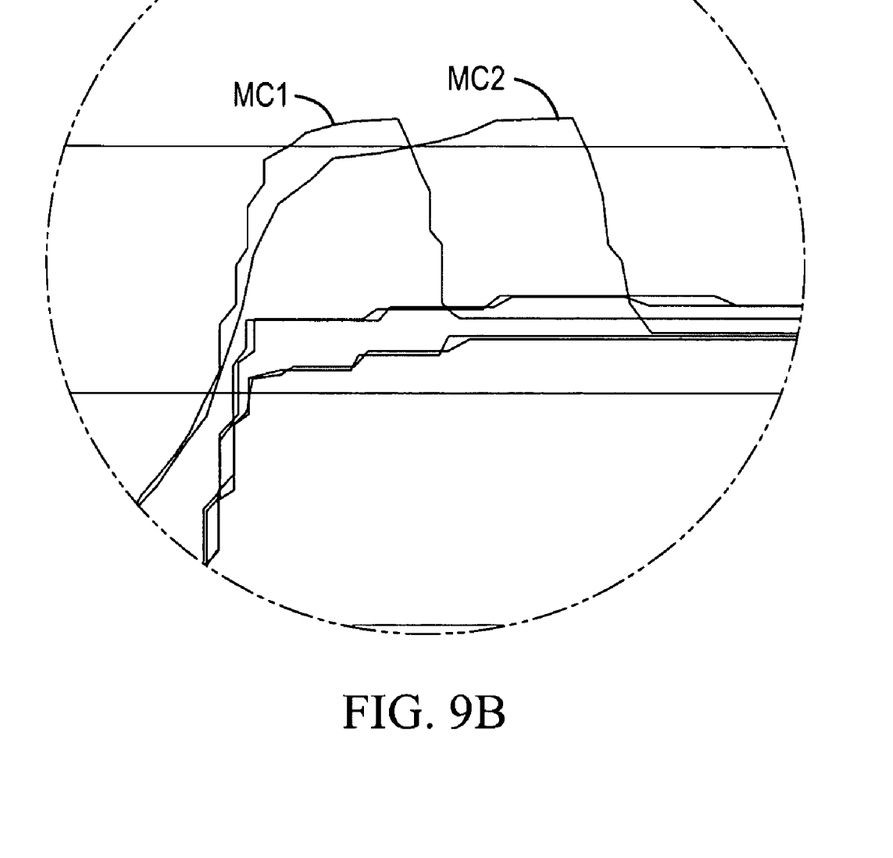
FIG. 9B shows a portion of the thermocouple data from FIG. 9A.

In FIGS. 9A and 9B, the furnace temperatures are identified by TC1 and TC2. The temperatures for the ceramic body of Catalyzed 2 Batch were taken at the top skin and mid-core of the body and are identified by TS1 and MC1, respectively, in FIGS. 9A and 9B. The temperatures for the ceramic body of Comparative 2 Batch were taken at the top skin and mid-core of the body and are identified by TS2 and MC2, respectively, in FIGS. 9A and 9B. As can be seen from the data in FIG. 9B, which is an expansion of the range encompassing 65 to 80 hours in FIG. 9A, the catalyzed pore former (graphite) burned out of the bodies more than 5 hours earlier than the standard uncatalyzed pore former.

Additionally, CTE measurements were taken from mid-core of the fired bodies and are provided in Table 5 below. As can be seen from the data, the CTEs were lower for the batch material comprising the catalyzed pore former than for the batch material comprising the uncatalyzed pore former.

TABLE 5

CTE Measurement of Fired Bodies

| Batch | CTE 800° C. ($\times 10^{-7}$/° C.) | CTE 1000° C. ($\times 10^{-7}$/° C.) |
|---|---|---|
| Comparative 2 | 7 | 8.3 |
| Catalyzed 2 | 5.7 | 7.4 |

What is claimed is:

1. A method of making a ceramic body, the method comprising:
   combining at least one catalyst and at least one carbonaceous pore former to form at least one catalyzed pore former;
   subsequently combining the at least one catalyzed pore former with at least one inorganic ceramic-forming component to form a batch material;
   forming a green body from the batch material; and
   firing the green body to burn out the at least one catalyzed pore former and form the ceramic body.

2. The method of claim 1, wherein the at least one catalyst reduces the apparent activation energy required for burn out of the at least one carbonaceous pore former.

3. The method of claim 1, wherein the at least one catalyst reduces at least one of the temperature and time for burnout of the at least one carbonaceous pore former.

4. The method of claim 1 wherein the ceramic body is substantially free of the at least one carbonaceous pore former.

5. The method of claim 1 wherein the ceramic body comprises a honeycomb structure.

6. The method of claim 1, wherein the ceramic body comprises at least one of aluminum titanate or cordierite.

7. The method of claim 1, wherein the at least one carbonaceous pore former is chosen from carbon, polymeric materials, and starches.

8. The method of claim 7, wherein the at least one carbonaceous pore former is graphite.

9. The method of claim 1, wherein the at least one catalyst is chosen from salts of alkali metals, alkali earth metals, transition metals, and lanthanide metals.

10. The method of claim 9, wherein the at least one catalyst is chosen from salts of calcium, potassium, copper, iron, nickel, and cerium.

11. The method of claim 1, wherein the at least one catalyzed pore former is comprised of from 0.01 wt % to 20 wt % of the at least one catalyst.

12. The method of claim 1, wherein the at least one catalyzed pore former comprises from 10 wt % to 50 wt % of the batch material as a super addition.

* * * * *